(12) United States Patent
Heibel

(10) Patent No.: US 7,448,812 B2
(45) Date of Patent: Nov. 11, 2008

(54) CAMERA MOUNT

(76) Inventor: Thomas S. Heibel, 4020 S. Elati St., Englewood, CO (US) 80110

( * ) Notice: Subject to any disclaimer, the term of this patent is extended or adjusted under 35 U.S.C. 154(b) by 313 days.

(21) Appl. No.: 10/908,808

(22) Filed: May 26, 2005

(65) Prior Publication Data
US 2005/0265711 A1 Dec. 1, 2005

Related U.S. Application Data (60) Provisional application No. 60/521,578, filed on May 27, 2004.

(51) Int. Cl.
*G03B 17/00* (2006.01)
(52) U.S. Cl. .................................................. 396/419
(58) Field of Classification Search ................ 396/419, 396/423, 428
See application file for complete search history.

(56) References Cited

U.S. PATENT DOCUMENTS

| | | | | |
|---|---|---|---|---|
| 4,270,679 A | * | 6/1981 | Gildea et al. ............... 396/423 |
| 4,863,130 A | * | 9/1989 | Marks, Jr. ................ 248/206.3 |
| 5,039,050 A | * | 8/1991 | Eidschun et al. ........... 396/419 |
| 5,246,193 A | * | 9/1993 | Faidley .................... 248/206.3 |
| 5,911,395 A | * | 6/1999 | Hussaini .................. 248/206.3 |

* cited by examiner

*Primary Examiner*—Christopher Mahoney
(74) *Attorney, Agent, or Firm*—Kyle W. Rost (57) ABSTRACT

A base plate (10, 50) broadly separates suction cups (12) on the bottom face of the base plate for attaching the base plate to a vehicle. A camera-mounting stud (14) extends from the base plate to mount a camera. The keeper plate (16) captures the enlarged head of a camera-mounting stud (14) under a dome (18). Multiple rivets secure the keeper plate to the top face of the base plate, reliably sandwiching the stud head against loss. A camera can be mounted on the threaded shaft of the stud, and the suction cups secure the base plate to a vehicle. Elongated extension rods (26) and swivel rods (30) separate the camera from the base plate. Flexible tethers connected to the camera can restore three-point stability to reduce camera movement while the vehicle is in motion.

13 Claims, 7 Drawing Sheets

CAMERA MOUNT

BACKGROUND OF INVENTION

1. Field of the Invention

The invention generally relates to supports and to brackets specially mounted or attached by vacuum, including plural mounted vacuum or suction cups.

2. Background Art

Photographers employ a number of devices to assist them in obtaining clear pictures under a variety of circumstances. The handheld camera may be the most versatile, because the photographer can support the camera to the best of his ability regardless of ambient conditions. For example, a photographer can take pictures from a moving car while merely holding the camera by hand. Under such conditions, distant shots such as landscapes might be satisfactory, while close shots might be unclear.

A rigid tripod is a common stability aid. If a tripod rests against a steady support, the camera will tend to be steady and produce a clear picture. Tripods are not entirely helpful in a moving car because the car is subject to vibrations and bouncing movements, which would be transmitted through the rigid tripod to the camera.

Some cameras even at the advanced consumer level include a stability motor, which helps to keep the picture steady despite the use of a high magnification lens. The stability motor is useful in controlling a degree of hand-held shaking. There are more sophisticated and costly systems to stabilize the picture in a moving camera. Some of these are best suited for professional use supported by a crew, such as in producing a professional motion picture. The advanced consumer photographer or even a large portion of professional photographers are unlikely to own or use an elaborate system due to the cost and preparation needed.

There continues to be a need for a stable camera mount that is versatile. Versatility is important in a mobile mount, intended for use with cars or other moving vehicles. A photographer may want to take advantage of a moving platform for taking pictures, but without extensively or permanently modifying the car, truck, boat, airplane, or other vehicle. Then it becomes important for the mobile camera mount to be adaptable to the chosen vehicle, and to whatever relevant shapes or structures are present on the vehicle. Further, depending upon the requirements of the job, the mobile mount may need to fit in any orientation. It would be desirable for a mobile camera mount to be widely versatile in its ability to mount on substantially any vehicle and in any orientation.

Ease of use also is important for a mobile camera mount. Such a device may be called upon at a moment's notice. The photographer likely does not wish to master a complex or technical system each time the mount is used. Thus, mounts that require special installation, jigs or calibrations may be satisfactory where used frequently; but such complexities are needless. It would be desirable for a mobile mount to have intuitive operation, such that it can be instantly employed without substantial preparation or experience.

U.S. Pat. No. 5,246,193 to Faidley is representative of prior art where a camera mount is somewhat portable but is limited in its versatility by its structures to use in a narrow operational environment. For example, the Faidley camera mount is suited to attach to the inside of a windshield by two suction cups, and an associated brace fits against the windshield to provide a third brace point. Even within the indicated useful environment, it must be noted that cars do not have a standardized windshield configuration. As a result, the configuration of the chosen vehicle may determine whether even such a specialized camera mount will fit.

To achieve the foregoing and other objects and in accordance with the purpose of the present invention, as embodied and broadly described herein, the method and apparatus of this invention may comprise the following.

SUMMARY OF THE INVENTION

Against the described background, it is therefore a general object of the invention to provide a versatile camera mount that is adaptable to many mounting surfaces, including the surfaces of a vehicle to enable photography from a moving vehicle.

According to the invention, a camera mount is suited to carry a camera from an external object. The mount is formed of a base plate that has first and second opposite faces. At least three attachment points on the base plate are suited to receive vacuum or suction cups. For simplicity of description, these cups will be referred to as suction cups. The attachment points are substantially coplanar and separated from one another. The attachment points can be viewed as corners or vertices of a closed geometric figure or bounded area. A plurality of at least three suction cups is arranged such that one of the suction cups is positioned on the first face of the base plate at each of the mounting locations. A fastening device connects the base plate to each of the suction cups. A base camera-mounting stud extends from the second face of the base plate within the bounded area. This arrangement permits the suction cups to mount the base plate to an external object, and a camera can be supported from such an external object by being mounted within the bounded area on the second face of the base plate.

The base plate 10 is planar. When the base plate is mounted to another object that also might be planar, a camera mounted on the base plate may be too close to such planar objects to avoid including them in pictures. Providing an extension rod solves this problem by elevating the camera to reduce the presence of the base plate from the field of view.

The base plate can attach to surfaces of variable contour and disposition. Although the base plate is generally planar, the plane of attachment may not be the desired camera position or camera angle. Providing a swivel rod that carries the camera can correct this problem by allowing the camera to tilt. One end of the swivel rod attaches to the base plate, while the second end attaches to the camera. The swivel rod includes an intermediate ball swivel that allows one end of the swivel rod to swivel at a variably selectable angular orientation with respect to the other end. Thus, a camera mounted on the swivel rod can be swiveled to a variably selectable angle with respect to the base plate. Further, the combination of an extension rod and a swivel rod can hold the camera in offset position from the base plate while orienting the camera to a desired camera angle.

To ensure that a camera carried on the mount is highly secure, the base plate carries a secure tripod stud. One end of the stud is enlarged. The enlarged end is retained in a reception area between the base plate and a keeper. The keeper is attached to the base plate by a plurality of fasteners. The fasteners are non-collinear and offset from the reception area so that they provide a broad attachment base for the keeper. Loads applied to the stud are distributed over the broad attachment base, such that it is difficult to dislodge the stud from the base plate. Thus, the stud is strongly retained on the base plate and suited to support a camera under conditions of bouncing, vibration, and wind load as might be encountered during use on a moving vehicle.

For added versatility, the camera mount employs all threaded devices of the same thread size. The suction cups are attached to the base plate by threaded fasteners, which are of the same thread size as the base camera-mounting stud. Any of the plurality of threaded devices is suited to engage a camera socket.

The camera mount enables the use of a unique method for taking photographs from a moving vehicle. The camera is mounted to a first side of the base plate. At least three suction cups are carried from the opposite side of the base plate. These suction cups are applied to a vehicle, which mounts the camera to the vehicle from the base mounting stud on the base plate. Two flexible tethers are attached to the camera and to the vehicle so that a three-point mounting then holds the camera securely. The advantages of this method are best realized when the camera is mounted on an extension rod or swivel rod. In that situation, the camera is separated from the base plate by the length of the rod or rods, which increases the impact of wind, bumps, and vibrations. The three-point support achieved by two added tethers is helpful to minimize camera movement when the camera is elevated from the base plate.

The accompanying drawings, which are incorporated in and form a part of the specification, illustrate preferred embodiments of the present invention, and together with the description, serve to explain the principles of the invention. In the drawings:

DETAILED DESCRIPTION

The invention is a versatile camera mount that is suited for supporting a camera from an external object such as a moving vehicle. In one aspect, the invention provides a camera mount that is especially adapted for use with a vehicle, although the mount can be used with any type of external object, such as tables or other furniture, windows, walls, ceilings or floors. In another aspect, the invention provides a combination of elements that cooperate with the camera mount to enable and make practical the taking of pictures from a vehicle. The camera mount and accessory equipment provide a secure and durable base for supporting a camera, whether it is a still camera or a motion picture camera. The base can be constantly monitored for security so that the photographer can take remedial action in case the base loosens.

Figure 1:
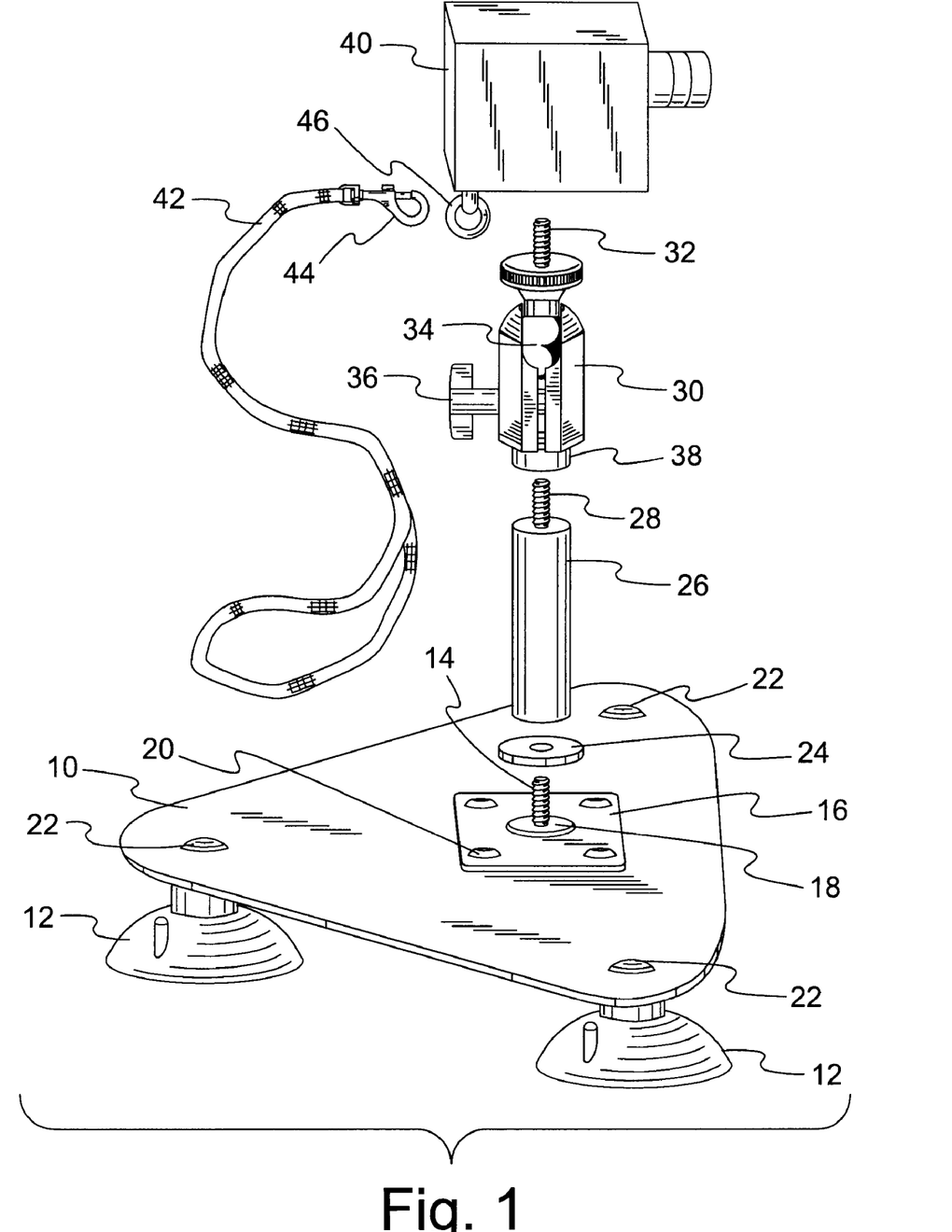
FIG. 1 is an exploded, isometric view of a camera mount and accessory equipment, showing an assembly of the mount and camera according to the invention.
Figure 2:
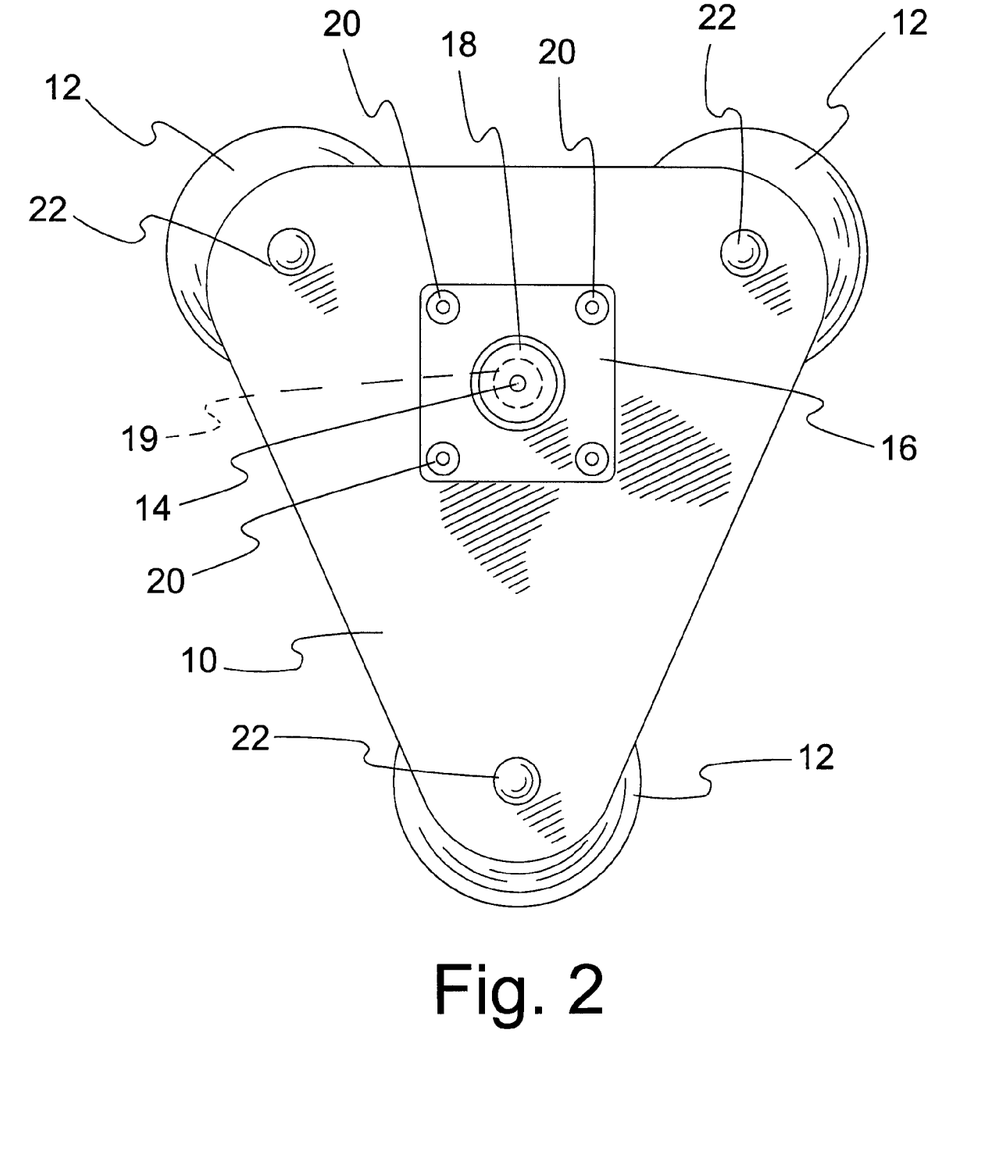
FIG. 2 is a top plan view of a camera mount according to the invention, showing an embodiment employing a triangular or three suction cup mount.
Figure 3:
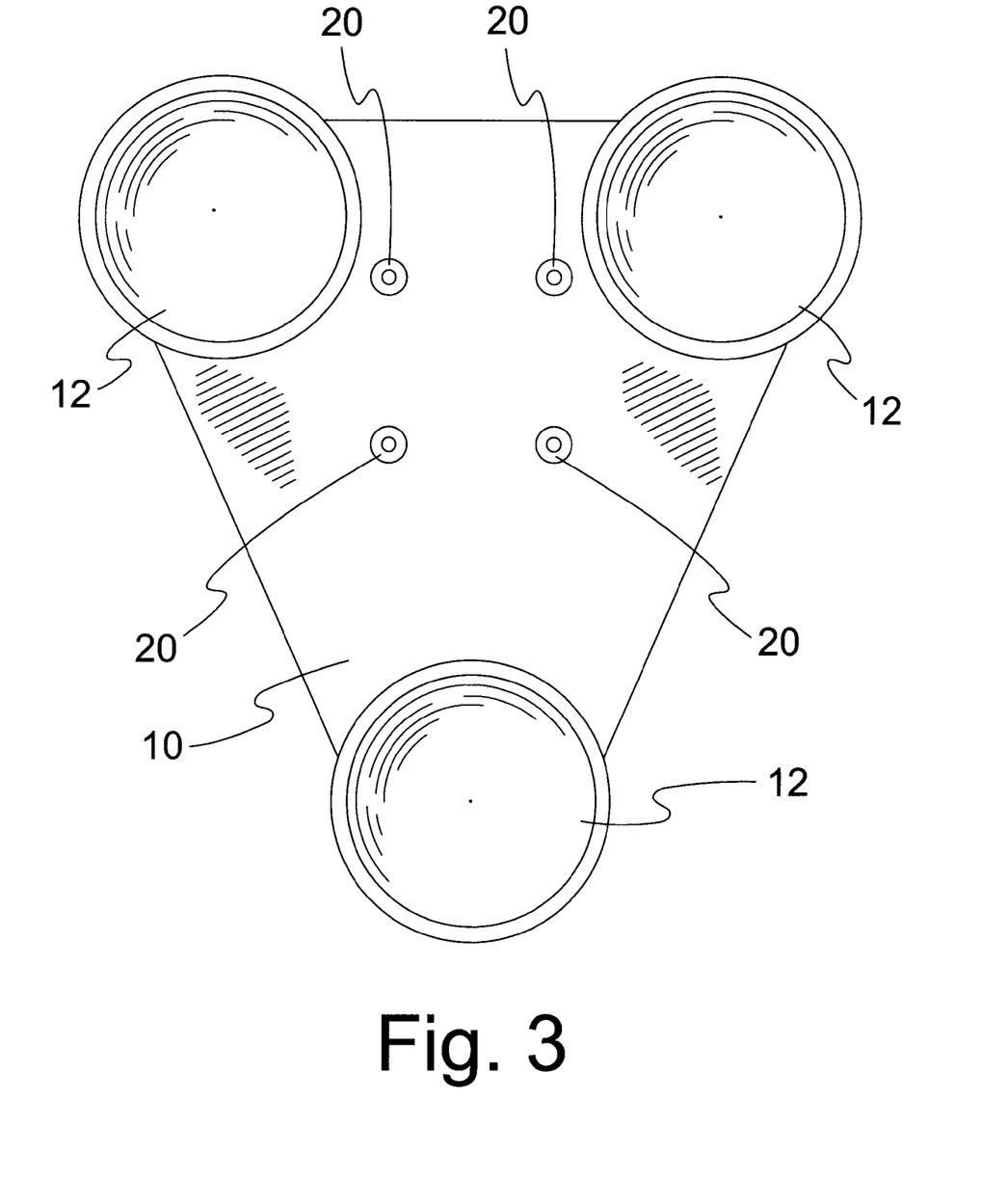
FIG. 3 is a bottom view of the camera mount of FIG. 2.

With reference to FIGS. 1-3, a first embodiment of the invention employs a base 10 that is shown as a generally triangular plate. The bottom face of the base 10 carries a plurality of suction cups 12, such as three cups. The cups are located at non-collinear attachment points, with one near each point of the triangle shape. The three suction cups provide three attachment points for mounting the base plate to an external object, thereby establishing a secure and stable mounting plane. The attachment points define corners or vertices of a closed plane geometric figure such as a polygon, or in this case a triangle. The area within the geometric figure is the preferred reception area for mounting a camera. Hence, a camera-mounting stud 14 is located within the area of the geometric figure, preferably near the center of the area.

The top face of the base 10 carries the camera-mounting stud 14. The stud is located within the geometric figure defined by the plural suction cups. For convenience of assembly, the stud is first mounted to a keeper plate 16, which is configured with a domed reception area 18 for receiving a typical enlarged head 19 of the stud 14. The threaded shaft of the stud protrudes through the dome and extends upward from the top surface of the base plate 10. The keeper plate 16 is fastened to the base plate by at least three non-collinear fasteners, which may be steel rivets 20. The rivets are arranged to establish at least a three-point mounting to the base plate 10. The keeper plate may be rectangular, providing four corners that are attached to the base plate 10 by a plurality of suitable fasteners, such as four rivets 20. The fasteners 20 are offset from the domed reception area 18 to near the periphery of the keeper plate. Like the suction cups, the rivets establish corners or vertices of a closed geometric figure such as a polygon. The stud 14 is mounted within the outlines of the polygon, preferably at the center of the polygon, to establish a broad fastening base for the stud 14. The head of stud 14 is retained in dome 18 and sandwiched between the keeper plate 16 and the base plate 10, such that the stud is reliably secured to the base plate 10.

The at least three-point fastening of the keeper plate 16 to the base plate 10 is complimentary to the at least three-point mounting of the base plate to an external object, provided by the three suction cups. Both mountings are resistant to loosening by wind loading, vibrations, and other typical forces encountered while mounted to the outside of a moving vehicle. Each suction cup 12 is securely attached to the base plate, which may be by a carriage bolt 22 connected through the base plate 10 into a nut mounted within the suction cup. The base plate 10 and the components attached directly to the base plate together define a camera mount that is functional to carry a camera attached to a moving vehicle. The suction cups permit the camera mount to be attached to a vehicle, as well as to many other objects, whether moving, movable, or stationary.

A camera mounted on base plate 10 may find that the base plate is within the camera's field of view, which may be undesirable. Similarly, the base plate 10 may be attached to a planar surface of a vehicle or other external object that also will be in the camera's field of view. Several accessory items expand the capabilities of the camera mount by improving the camera's working position. The first of these is one or more resilient washers 24, typically constructed of rubber. The washer 24 fits over stud 14 or any other similarly sized stud to damp vibration and prevent unscrewing of an item mounted on any such stud. The second accessory item is one or more extension rods 26, which screws at its bottom or proximal end to a stud 14. The top or distal end of rod 26 carries a further camera-mounting stud 28, which for purposes of identification will be referred to as the remote stud. The shank of the rod between the two ends is useful to space the camera from the base plate 10 or to change the position of the camera by the length of the shank.

Another accessory item is one or more swivel rods 30. A bottom or proximal end of a swivel rod 30 receives a stud 14 or 28 and carries a further camera-mounting stud 32 at its top or distal end. For purposes of identification, stud 32 will be referred to as the alternate stud. The swivel rod carries a ball swivel 34 in a split housing. The ball swivel carries the alternate stud 32, allowing the angle of the alternate stud to be varied with respect to the housing. Thus, a camera mounted on alternate stud 32 can be varied in angle over a considerable range. A clamp 36 controls the separation between halves of the housing, thus regulating the tightness with which the housing clamps the ball swivel. The housing holds a reception socket carrier 38 for a camera-mounting stud, allowing the housing to be secured to either stud 14 or 28. The swivel rod is useful for correcting the camera's orientation. The base plate 10 may be mounted to an external surface that is disposed at a non-preferred orientation for purposes of photography. A swivel rod 30 allows the camera to be reoriented to a desired angular disposition.

Figure 7:
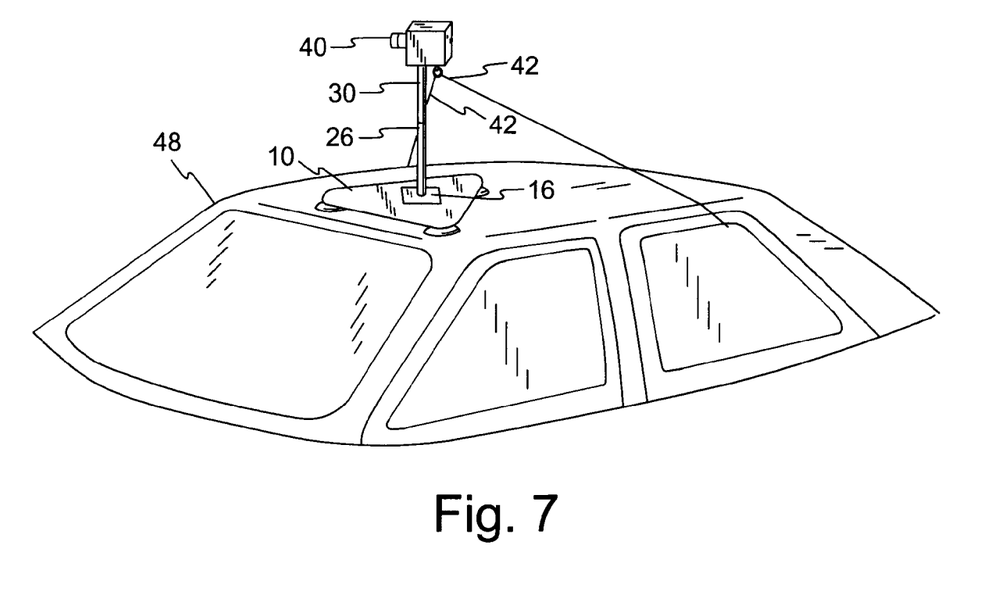
FIG. 7 is fragmentary isometric view of a camera mount on a vehicle, showing only a portion of the vehicle.

A camera 40 is mounted to any selected stud 14, 28, or 32, depending upon the equipment chosen for use. While FIG. 1 shows both the extension rod 26 and the swivel rod 30 in combined use, either can be used without the other. Use of the rubber washer 24 is recommended regardless of whether the other two accessories are chosen. When a camera is mounted at a spacing from the base plate 10, such as on extension rod 26, swivel rod 20, or any combination of such components, the camera can become less stable or unstable. The elongated rods 26, 30 effectively act as a single mounting point for the camera. Especially when the camera mount is carried on a moving vehicle 48 as shown in FIG. 7, vibrations and others forces will act upon the camera through the elongated rods 26, 30. Despite the stable planar attachments established for the keeper plate 16 and for the base plate 10, those attachments may be insufficient to steady a camera mounted on the intermediate rods 26, 30.

In order to monitor and improve the stability of the camera mount, a leash, tether, neck strap or the like 42 is connected to the camera. For convenience of description, this item will be referred to as a tether. One end of the tether 42 carries a fastener 44 for engaging the camera. Preferably the fastener is a latching fastener, as suggested by the illustrated spring latch in FIG. 1. Substantially every camera provides a connecting point 46 for a neck strap, wrist strap, or the like. One or more tethers can be attached to such a connecting point. The tether should be of considerable length, such as three to four feet.

In use, and according to a method of use, one or more tethers 42 is attached to the camera 40. The camera is attached to the base plate 10, directly or via a tower of spacers, swivels, or other like accessories. The base plate is secured to an external object such as a vehicle 48 by pushing-on the suction cups. If the camera is not accessible during vehicle motion, any desired aiming, focusing, or camera settings can be preadjusted before the vehicle 48 begins motion. The camera can be operated by whatever mechanism is available, such as a fixed switch, a cable release, a remote control, or a timer.

When the camera is mounted to a vehicle 48, if possible the tethers 42 are routed from the camera and into the vehicle by any available passages, such as through a window or door edge as suggested by FIG. 7. When two or more tethers 42 are used, the tethers should be routed separately so that each tether establishes an independent attachment point. For example, the tethers 42 of FIG. 7 are routed to opposite sides of the vehicle 48 from the camera mounted to the roof. Each tether is clamped in a window of vehicle 48. Two tethers connected to two attachment points on a vehicle will complete a three point mount, together with the mounting point that the tower of spacers 26, 30 provides.

When the camera has been prepared, the vehicle is placed in motion and the desired photographic session can take place. Because vehicles can be operated in an unpredictable variety of conditions, it is recommended that the camera and camera mount be monitored continuously while the vehicle is moving. Throughout the period when the vehicle is moving, an attendant in the vehicle should maintain hand contact with the tethers in order to sense any change in camera position or condition. In some situations, such as where the vehicle is an airborne aircraft, it may be impractical to stop for temporary adjustments. In such a case, the tethers may provide the additional ability of allowing the attendant to secure and recover loose equipment. If not possible for an attendant to directly hold and monitor the tether, the tether can be secured to the vehicle by other fastening means, such as strong tape, commonly known as duct tape.

Figure 4:
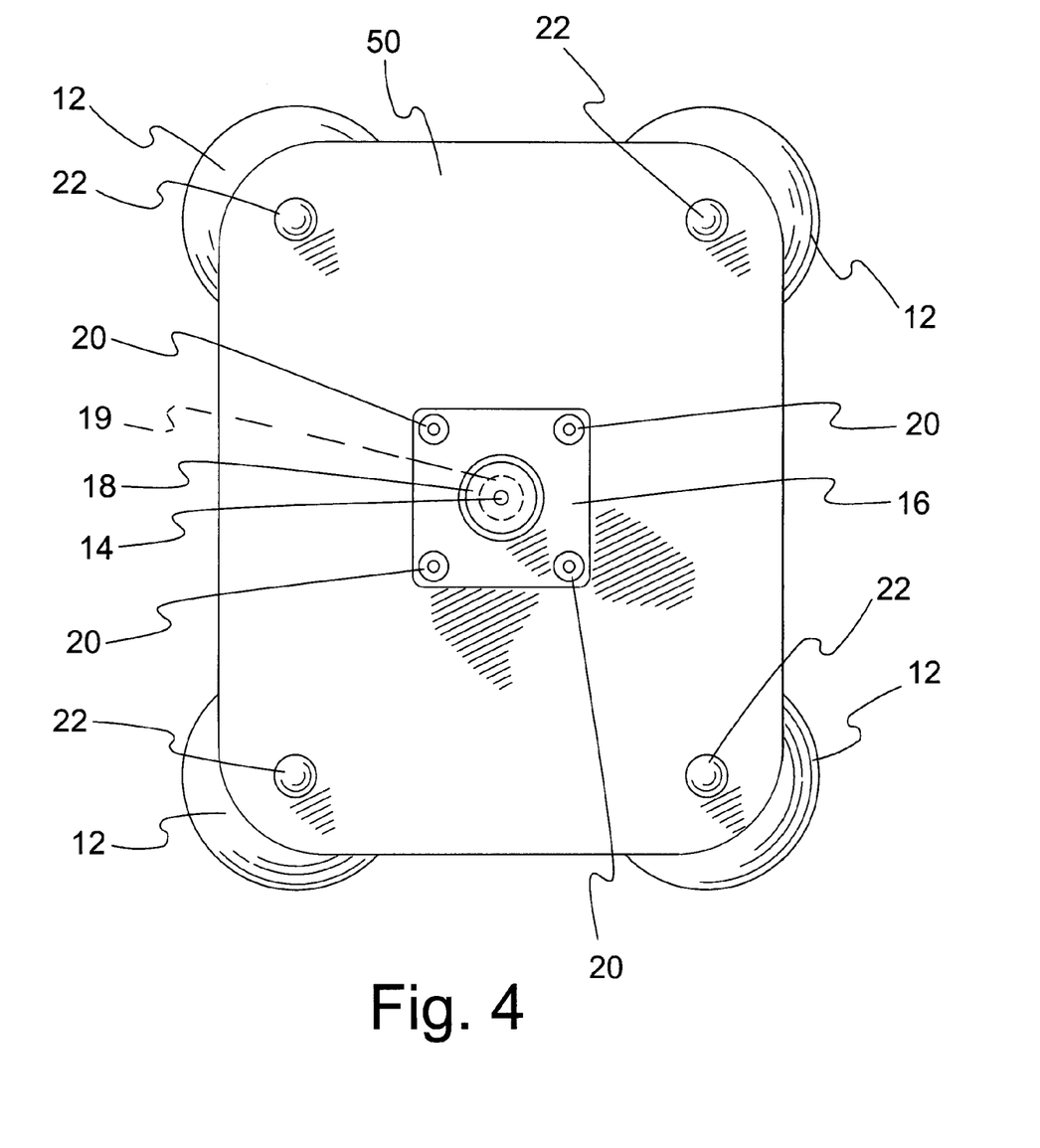
FIG. 4 is a top plan view of a camera mount according to the invention, showing an embodiment employing a rectangular or four suction cup mount.
Figure 5:
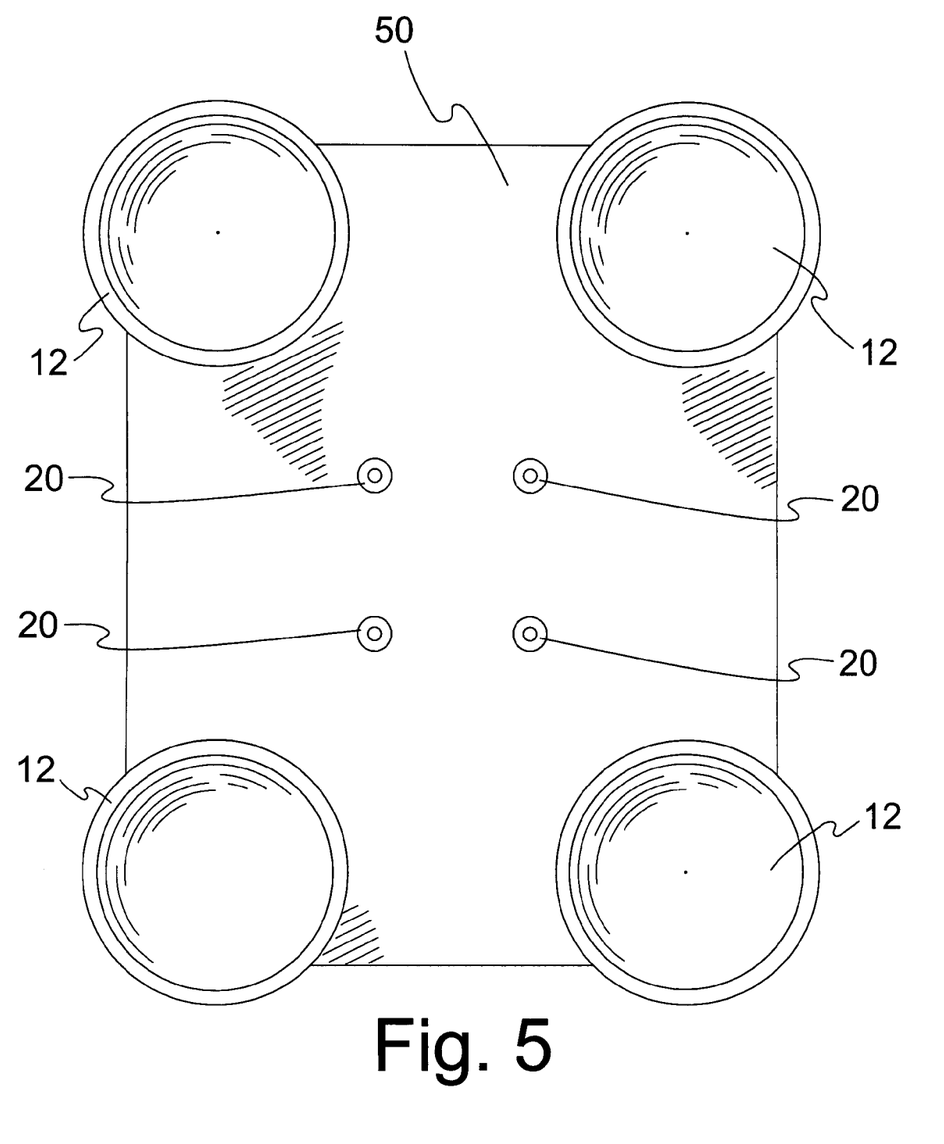
FIG. 5 is a bottom view of the camera mount of FIG. 4.
Figure 6:
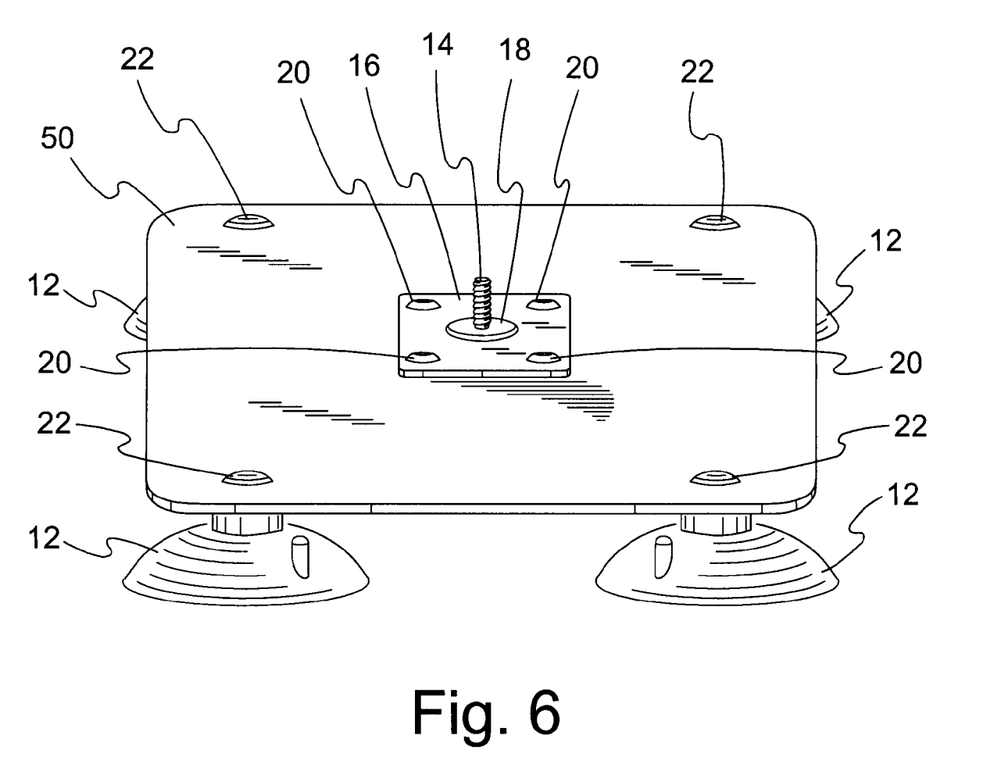
FIG. 6 is an isometric view of the camera mount of FIG. 4.

FIGS. 4-6 show a second embodiment of the camera mount and provide another camera mount suitable for use in the method of this invention. Similar reference numbers will be used to describe elements in common with the previous embodiment. The base plate 50 is rectangular and provides four corner areas where a suction cup 12 can be suitably attached to the bottom face of the base plate. Carriage bolts 22 provide a suitable means of attachment through the base plate 50. The top face of the base plate 50 carries a camera-mounting stud 14. As previously described, a keeper plate 16 captures the head of the stud 14 under a dome 18. Rivets 20 attach the keeper plate to the base plate 50.

The rectangular configuration of base plate 50 offers four convenient corner locations for attaching and operating suction cups 12. This configuration is suited for a larger or heavier camera than with the prior embodiment. The presence of four suction cups provides redundant security if one suction cup should fail, as the remaining three cup locations continue to establish a secure plane of attachment.

According to a specific preferred construction and mode of use, the camera mount is formed of a base plate 10, 50 having sufficient strength and rigidity that the base plate maintains stability during use. For example, a preferred base plate is made of grade 5150 aluminum and is of 0.090-inch thickness. Thickness substantially less than this, such as 0.075 inches, tended to be too flexible and allowed too much bouncing in a camera mounted to a moving car on a bumpy road. Thickness substantially greater than this, such as 0.125 inches, tended to be too rigid when the base plate was mounted on a curved or irregular surface. The thicker base plate did not conform well to the irregular surface and produced too much pulling force against some of the suction cups 12.

The base plate 10, 50 and the keeper plate 16 serve important functions by dissipating lateral bending forces applied to the mounting stud 14. The sizes of these plates are helpful in dissipating the forces without damage and without pulling free a suction cup. A triangular plate 10 may have from about five to eight inches between suction cups on each side. A rectangular plate 50 may employ similar dimensions per side. The rivets on the keeper plate are about two inches apart per side.

The preferred camera mount was assembled by spot welding the head of stud 14 to the lower side of keeper plate 16. The keeper plate 16 then was attached to base plate 10, 50 by steel rivets 20. The stud 14 on the base plate is secure, which is especially desirable on a device that can be used on a moving vehicle.

The suction cups 12 were attached to the base plate 10, 50 by carriage bolts 22 that engaged nuts molded into the stems of the suction cups. The carriage bolts 22 and mounting studs 14, 28, and 32 are selected to be the same size. The chosen size should be the same as for a typical camera socket, designed to receive a tripod stud. Camera sockets are believed to be uniform in size at ¼-20 thread. Thus, all of the threaded elements were chosen to be size ¼-20. This common sizing of threaded elements makes possible a wide range of camera-mounting options. For example, a suction cup 12 could be removed from the base plate and mounted directly to a camera socket by use of a ¼-20 stud. Further, because all threaded elements are the conventional size to mate with a socket, it becomes impossible to make an error by selecting a threaded element that does not fit the socket of a camera.

During use of the camera mount, the various accessory items can be used in different numbers and combinations. For example, extension rods 26 can be made available in different lengths, such as three inches, six inches, and one foot. A plurality of extension rods 26 can be used in series to achieve a desired camera elevation from the base plate. Likewise, a plurality of tethers 42 can be attached to a camera in order to stabilize its position. For example, two tethers 42 can combine with one column of extension rods 26 to establish three-point support to stabilize a camera on a moving vehicle.

Especially when the camera 40 is on a tower of spacers 26, 30 and tethered as shown in FIG. 7, substantial bending forces can be applied to the base stud 14. The keeper plate 16 spreads these forces over a broad area. Similarly, the base plate 10 provides another broad support so that bending forces are widely distributed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

What is claimed is:

1. A camera mount, suited to carry a camera from an external object, comprising:
   a base plate having first and second opposite faces, defining at least three attachment locations suited to receive suction cups, wherein said attachment locations are substantially coplanar with one another, separated from one another, and define a planar bounded area;
   a plurality of at least three suction cups arranged such that a different one of said at least three suction cups is positioned on a face of said base plate at each of said attachment locations such that the at least three suction cups are mounted to the base plate in alignment on parallel axes;
   means for fastening said base plate to the suction cups, such that the base plate carries the three suction cups respectively at the at least three attachment locations; and
   a base camera-mounting stud extending from said second face of the base plate within said bounded area for receiving a camera;
   whereby the suction cups mount the base plate to an external object for carrying a camera by an attachment point within the bounded area.

2. The camera mount of claim 1, further comprising:
   an extension rod having a proximal end attached to said base camera-mounting stud, a distal end carrying a remote camera-mounting stud, and having a shank of preselected length between said proximal and distal ends;
   whereby a camera mounted on the distal end of the extension rod is spaced from the base plate by the preselected length of the shank.

3. The camera mount of claim 1, further comprising:
   a swivel rod having a proximal end attached to said base camera-mounting stud, a distal end carrying an alternate camera-mounting stud, and between said proximal and distal ends having a ball swivel allowing the distal end to swivel at variably selectable angle with respect to the proximal end;
   whereby a camera mounted on the distal end of the swivel rod can be oriented with respect to the base plate at a variably selectable angle.

4. The camera mount of claim 1, further comprising:
   an extension rod having a proximal end attached to said base camera-mounting stud, a distal end carrying a remote camera-mounting stud, and having a shank of preselected length between said proximal and distal ends;
   a swivel rod having a proximal end attached to said remote camera-mounting stud, a distal end carrying an alternate camera-mounting stud, and between said proximal and distal ends having a ball swivel allowing the distal end to swivel at variably selectable angle with respect to the proximal end;
   whereby a camera mounted on the distal end of the swivel rod is spaced from the base plate and can be oriented at a variably selectable angle.

5. The camera mount of claim 1, further comprising:
   a keeper plate;
   a plurality of keeper plate fasteners securing said keeper plate to said base plate;
   wherein:
   said base camera-mounting stud has an enlarged end;
   the keeper plate and base plate define between themselves a reception area confining said enlarged end; and
   said keeper plate fasteners are offset from the reception area, defining a broad attachment base securing the base camera-mounting stud to the base plate;
   whereby the base camera-mounting stud is retained on the base plate by the broad attachment base.

6. The camera mount of claim 1, wherein:
   said base camera-mounting stud is threaded by threads of a first preselected thread size suited to engage a camera socket; and
   said means for fastening said base plate to the suction cups comprises:
   a plurality of at least three threaded fasteners of a second preselected thread size, arranged such that a different one of said threaded fasteners is engaged in each of said suction cups, extends through the base plate, and is retained on the second side of the base plate;
   wherein said first preselected thread size is the same as said second preselected thread size, whereby the plurality of threaded fasteners and base camera-mounting stud each are suited to engage a camera socket.

7. A method of mounting a camera to a moving vehicle, comprising:
   attaching a camera to a threaded stud held on a first side of a base plate by a keeper plate having at least three fasteners to the base plate in non-collinear positions, such that the at least three fasteners are located at vertices of a first polygon, and the threaded stud is located within the area of the first polygon;
   mounting the base plate to a vehicle by at least three suction cups connected to a second side of the base plate in non-collinear positions, such that the at least three suction cups are located at vertices of a second polygon, and the threaded stud is located within the area of the second polygon; and tethering the camera to the vehicle by a flexible tether, thereby establishing a support point.

8. The method of claim 7, wherein said step of attaching a camera comprises:
providing a longitudinally elongated member having a first end adapted for attachment to said base plate and having a second end adapted for attachment to said camera, wherein said first and second ends are spaced apart by a shank of preselected length;
mounting a camera to the second end of the elongated member; and
mounting the first end of the elongated member to the base plate, whereby the camera is spaced from the base plate by the preselected length of the shank, at a first attachment point; and
tethering the camera to the vehicle by at least two flexible tethers, thereby establishing a three point mounting.

9. A camera mount, suited to carry a camera from an external object, comprising:
a base plate having opposite major faces, defining at least three attachment locations suited to receive suction cups, wherein said attachment locations are substantially coplanar, separated from one another, and define a bounded area of the base plate;
a plurality of at least three suction cups arranged such that a different one of said at least three suction cups is positioned on a major face of said base plate at each of said attachment locations;
means for fastening the base plate to the suction cups, such that the base plate carries the three suction cups respectively at the at least three attachment locations;
a base camera-mounting stud having a distal end extending remotely from the base plate and a proximal end located proximate to the base plate within said bounded area;
a keeper plate positioned on a major face of the base plate within the bounded area in a configuration such that said keeper plate and base plate define between themselves a reception area containing the proximal end of the base camera-mounting stud, wherein the keeper plate and the proximal end of the base camera-mounting stud are suitably secured together to retain the proximal end in the reception area;
a plurality of keeper plate fasteners securing said keeper plate to the base plate at positions offset from said reception area whereby the keeper plate defines a broad attachment base securing the base camera-mounting stud to the base plate, and the suction cups mount the base plate to an external object for carrying a camera by an attachment point within the bounded area.

10. The camera mount of claim 9, further comprising:
an extension rod having a proximal end attached to said base camera-mounting stud, a distal end carrying a remote camera-mounting stud, and having a shank of preselected length between said proximal and distal ends;
whereby a camera mounted on the distal end of the extension rod is spaced from the base plate by the preselected length of the shank.

11. The camera mount of claim 9, further comprising:
a swivel rod having a proximal end attached to said base camera-mounting stud, a distal end carrying an alternate camera-mounting stud, and between said proximal and distal ends having a ball swivel allowing the distal end to swivel at variably selectable angle with respect to the proximal end;
whereby a camera mounted on the distal end of the swivel rod can be oriented with respect to the base plate at a variably selectable angle.

12. The camera mount of claim 9, further comprising:
an extension rod having a proximal end attached to said base camera-mounting stud, a distal end carrying a remote camera-mounting stud, and having a shank of preselected length between said proximal and distal ends;
a swivel rod having a proximal end attached to said remote camera-mounting stud, a distal end carrying an alternate camera-mounting stud, and between said proximal and distal ends having a ball swivel allowing the distal end to swivel at variably selectable angle with respect to the proximal end;
whereby a camera mounted on the distal end of the swivel rod is spaced from the base plate and can be oriented at a variably selectable angle.

13. The camera mount of claim 9, wherein:
said base camera-mounting stud is threaded by threads of a first preselected thread size suited to engage a camera socket; and
said means for fastening said base plate to the suction cups comprises:
a plurality of at least three threaded fasteners of a second preselected thread size, arranged such that a different one of said threaded fasteners is engaged in each of said suction cups, extends through the base plate, and is retained on the second side of the base plate;
wherein said first preselected thread size is the same as said second preselected thread size, whereby the plurality of threaded fasteners and base camera-mounting stud each are suited to engage a camera socket.

* * * * *